(12) United States Patent
Mathias et al.

(10) Patent No.: US 6,480,627 B1
(45) Date of Patent: Nov. 12, 2002

(54) IMAGE CLASSIFICATION USING EVOLVED PARAMETERS

(75) Inventors: Keith E. Mathias, Ossining, NY (US); Murali Mani, Chappaqua, NY (US); J. David Schaffer, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/343,649

(22) Filed: Jun. 29, 1999

(51) Int. Cl.$^7$ ............................ G06K 9/00; G06K 9/62; H04N 7/18; H04N 1/00; G06E 1/00
(52) U.S. Cl. ..................... 382/224; 382/112; 382/141; 382/149; 382/159; 382/181; 382/209; 382/225; 382/309; 348/86; 348/92; 358/406; 706/20
(58) Field of Search ........................... 382/112, 115, 382/116, 117, 118, 141, 145, 147, 149, 155, 156, 157, 158, 159, 173, 181, 190, 209, 218, 219, 224–228, 278, 289, 309; 348/86, 92; 704/202; 706/15, 16, 20, 25, 31, 34, 44; 358/406; 707/1, 4, 5, 6

(56) References Cited

U.S. PATENT DOCUMENTS

| | | | | |
|---|---|---|---|---|
| 5,048,100 A | * | 9/1991 | Kuperstein | 382/157 |
| 5,214,746 A | * | 5/1993 | Fogel et al. | 706/25 |
| 5,815,198 A | * | 9/1998 | Vachtsevanos | 348/88 |
| 6,272,479 B1 | * | 8/2001 | Farry et al. | 706/13 |

FOREIGN PATENT DOCUMENTS

| | | | | |
|---|---|---|---|---|
| DE | 19713382 A | 1/1998 | | G06K/9/66 |

OTHER PUBLICATIONS

Medsker "Hybrid Intelligent Systems" KAP, 1995, pp. 128–140.*

English Translation of German Patent No. DE19713382.*

Perez et al., "Optimization of One and Two Hidden Layer Neural Network Architectures for Handwritten Digit Recognition".

* cited by examiner

*Primary Examiner*—Leo Boudreau
*Assistant Examiner*—Daniel G. Mariam

(57) ABSTRACT

An evolutionary algorithm evolves alternative architectures and parameters for an image classification system. In a preferred embodiment, a learning system is employed, and during the training period of the learning system, the architecture of the learning system is evolved so as to create a learning system that is well suited to the particular classification problem set. In like manner, other parameters of the image classification system are evolved by the evolutionary algorithm, including those that effect image characterization, learning, and classification. An initial set of parameters and architectures are used to create a set of trial classification systems. A number of pre-classified evaluation images are then applied to each system, and each system's resultant classifications for each test case is compared to the proper classification of each test case. Subsequent trial classification systems are evolved based upon the parameters and architecture of the better performing classification systems. The best performing classification system is then selected as the production classification system for classifying new images.

18 Claims, 3 Drawing Sheets

IMAGE CLASSIFICATION USING EVOLVED PARAMETERS

BACKGROUND OF THE INVENTION

1. Field of the Invention

This invention relates to the field of image processing, and in particular to pattern recognition for image classification.

2. Description of Related Art

Pattern recognition techniques are often used to classify images, or portions of images. A particular application of pattern recognition for classification is the "visual" inspection of manufactured items. Traditionally, human inspectors view the item at various stages of the manufacturing process, looking for telltale evidence of a manufacturing error. This staged approach is used to identify a defective item before subsequent costs are incurred by continuing the manufacture of the defective item, and/or to identify the defect at a stage when the repair of the defect is economically feasible. Generally speaking, the cost of defect detection and correction increases exponentially with each processing step.

A particular example of visual inspection is in the manufacture of a display device, such as a Cathode Ray Tube (CRT). The manufacture of a CRT is a multi-step process. Various layers of materials are applied to the interior of the display surface, for example, before the tube is sealed and evacuated. A critical defect in the application of any layer of material renders the CRT unsuitable for sale, and therefore inspection procedures are implemented to identify such defects before the tube is sealed. Often, critical defects are correctable, for example, by "undoing" the manufacturing steps back through the step at which the critical defect was introduced. In the CRT process, for example, layers of material can be removed, or defects can be corrected before the next layer is applied. Also, if the error in manufacturing that caused the defect is systematic, rather than random, a rapid identification of a defect can minimize the number of subsequent items produced by this systematic error. Manufacturing errors often produce visually apparent anomalies that have characteristics that can be used to identify the particular manufacturing error that caused the anomaly. In the CRT example, one of the internal components is a "shadow mask" that has a hole corresponding to each pixel location on the screen, through which electron beams travel before impinging upon the luminescent red, green, and blue phosphor dots corresponding to the intended color content of each pixel. A defect in the shadow mask is visually apparent as an anomaly that spans all three phosphor dots. If three adjacent red, green, blue dot locations are substantially dimmer than surrounding dots, it is highly likely that the corresponding hole in the shadow mask is obstructed, and appropriate corrective measures can be taken to clear the obstruction before other manufacturing steps are taken that would make the correction economically infeasible. Anomalies with different visual characteristics imply other classes of defect, and different corrective measures would typically be applied to correct each class of defect. The automation of the defect classification task is effected by processing an image of the screen to search for the characteristic patterns, such as three adjacent dim dots, for each defect class.

Another application of pattern recognition is the classification of images for subsequent retrieval. For example, one might classify each painting in an art collection into portraits, landscapes, figures, seascapes, and so on. An automation of the classification task may include, for example, scanning the painting for a large central area of flesh-color (portrait), a large upper area of blue and/or white, with little, if any, blue content below (landscape), and so on. Edge detecting and edge characterization processes are also commonly used to classify image content.

A variety of techniques are available for classifying images based on characteristic patterns. As presented above, algorithms, or rules, can be defined corresponding to each classification, such as "if 3-adjacent dim dots, then shadow mask defect", or "if upper area is blue and lower area is not blue, then landscape", and so on. Such systems are viable when a set of rules can be determined for each classification. The rules for each classification must be broad enough to encompass the possible range of characteristic patterns within each classification, yet not so broad so as to include images that do not properly belong within each classification.

As an alternative to a rule based system that requires specific rules, learning systems are commonly employed to develop characterization processes based on representative samples of each classification. Neural networks are commonly employed to effect such learning systems. A conventional neural network comprises one or more input nodes, one or more output nodes, and a plurality of intermediate, or hidden, nodes that are arranged in a series of layers between the input and output nodes. In a common neural net architecture, each input node is connected to each hidden node in a first layer of nodes, each hidden node in the first layer of nodes is connected to each hidden node in a second layer of nodes, and so on until each node of the last layer of hidden nodes is connected to each output node. The output of each node is a function of a weighted combination of each input to the node. In a feedforward neural net, when a set of input values is applied to the input nodes, the weighted values are propagated through each layer of the network until a resultant set of output values is produced. Other configurations of nodes, interconnections, and effect propagation are also common.

In a learning mode, the resultant set of output values is compared to the set of output values that a properly trained network should have produced, to provide an error factor associated with each output node. In the case of pattern matching for classification, each output node may correspond to a particular class. The output node of the true class corresponding to the set of input values should have a large output value, while the incorrect class output nodes should have a low value. The error factor is propagated back through the network to modify the weights of each input to each node so as to minimize a composite-of the error factors. The composite is typically the sum of the square of the error factor at each output node. Conceptually, the node weights that contributed to the outputs of the incorrect class are reduced,while those that contributed to the output of the correct class are increased.

Thereafter, the next input set of values is applied with the adjusted weights, the error factors are recomputed, and the weights are readjusted. This process is repeated for each set of input values used for training, and then the entire process is repeated for a fixed number of iterations or until subsequent iterations demonstrate a convergence to the correct class, or until some other termination criterion is achieved. Once the set of weights is determined, the resultant network can be used to classify other items, items that were not part of the training set, by providing the corresponding set of input values from each of the other items, and choosing the class having the highest output node value. Note that the magnitude of the feedback modification to the weights is chosen to balance between overcorrecting and undercorrecting. An overcorrection of weights for each training input set may result in an oscillation of weight values that preclude convergence; an undercorrection of weights for each training input set may require an excessive number of iterations to reach convergence, or may converge to a local minimum. The magnitude of the modification of weights may be different for each layer in the network.

The performance of the neural network for a given problem set depends upon a variety of factors, including the number of network layers, the number of hidden nodes in each layer, the weight adjustment factors, and so on. Given a particular set of network factors, or network architecture, different problem sets will perform differently. That is, the performance of the neural network used for classification based on pattern recognition will depend upon the selected architecture for the neural network and the various factors associated with this architecture. In like manner, the performance of other pattern recognition systems, such as rule based systems will depend upon the particular parameters selected for the recognition process.

BRIEF SUMMARY OF THE INVENTION

It is an object of this invention to provide an image classification system that does not require an a priori definition of rules. It is a further object of this invention to provide an image classification system that does not require an a priori definition of a specific learning system architecture.

These objects and others are achieved by providing an evolutionary algorithm that provides alternative architectures and parameters to an image classification system. In a preferred embodiment, a learning system is employed, and during the training period of the learning system, the architecture of the learning system is evolved so as to create a learning system that is well suited to the particular classification problem set. In like manner, other parameters of the image classification system are evolved by the evolutionary algorithm, including those that effect image characterization, learning, and classification. An initial set of parameters and architectures are used to create a set of trial classification systems. A number of pre-classified evaluation images are then applied to each system, and each system's resultant classifications for each test case is compared to the proper classification of each test case. Subsequent trial classification systems are evolved based upon the parameters and architecture of the better performing classification systems. The best performing classification system is then selected as the production classification system for classifying new images.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
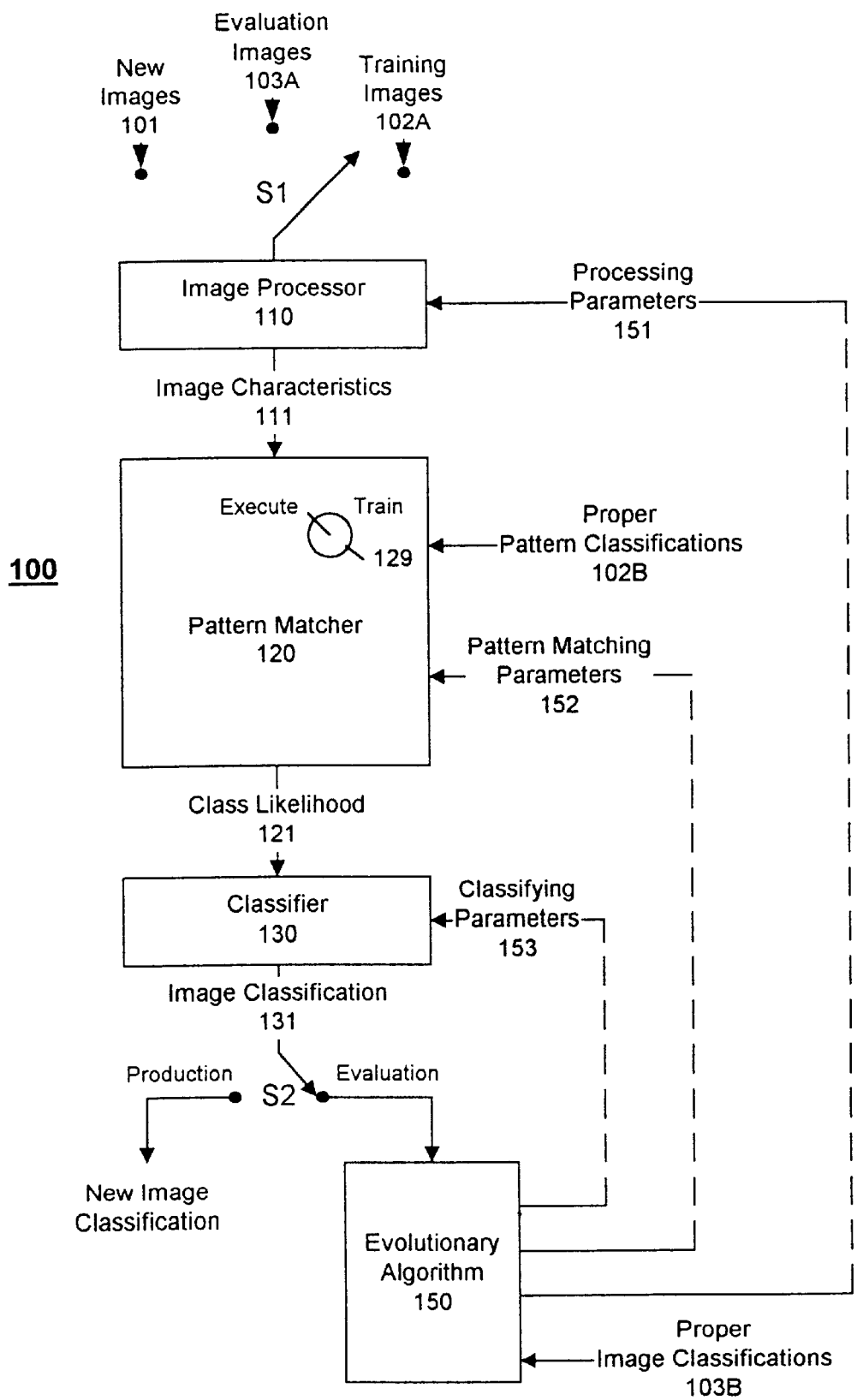
FIG. 1 illustrates an example block diagram of an image classification system in accordance with this invention.

FIG. 1 illustrates an example block diagram of an image classification system 100 in accordance with this invention. The image classification system 100 includes an image processor 110, a pattern matcher 120, and a classifier 130, each of which may receive parameters from an evolutionary algorithm 150, as discussed further below.

The image processor 110 processes an image to produce a set of image characteristics 111 that describe the image. A variety of techniques are commonly available in the art to provide a set of characteristics 111 that describe an image. A common characterization process includes partitioning the image into a fixed number of rows and columns, and the set of image characteristics 111 is a set of values representing each partition. For example, each partition can be characterized by the average brightness, or luminance, of the partition; or, for more detail concerning the partition, the predominant color of the partition, or the average luminance associated with each color component. Images are also commonly characterized by the occurrence of edges in the image. Each partition of the image may be represented by the number of horizontal and vertical lines within the partition. A frequency analysis, such as a Discrete Cosine Transform (DCT), of each partition conveys a significant amount of information regarding the content of each partition.

The pattern matcher 120 processes the image characteristics 111 to produce a set of class likelihoods 121, representing the likelihood that the image corresponds to each of a set of predefined classes of patterns. In a preferred embodiment, the pattern matcher 120 operates in one of two modes: a training mode, or an execution mode, as represented by the switch 129 in FIG. 1, although a non-trainable pattern matcher, such as a rule-based system may also be used. In the training mode, the pattern matcher 120 develops a multidimensional correlation relationship between the input image characteristics 111 and the output class likelihoods 121, as typified by the prior art neural network training scheme discussed above. In the training mode, image characteristics 111 that correspond to training images 102A are provided to the pattern matcher 120, as well as the corresponding proper pattern classification 102B. That is, each training image 102A has a corresponding image classification 102B, provided, for example, by expert humans who view and classify the training images 102A. Using, for example, the prior-art neural network example of a learning system, the weight of each input to each node is adjusted such that the weights that lead to a difference between the classification that the pattern matcher produces and the proper classification 102B that the human experts provide are reduced, while the weights that lead to a correspondence between the produced classification and proper classification 102B are increased. In this manner, when placed in the execute mode by switch 129, a new image 101 having image characteristics 111 that are similar to one of the training images 102A is biased by the weights to produce a class likelihood output 121 that is similar to the corresponding proper pattern classification 102B. As noted above, a variety of techniques are common in the art to provide a measure of correspondence 121 between a set of image characteristics 111 and a predefined pattern class.

The classifier 130 processes the class likelihood factors 121 to determine the classification of the image. In a simple binary classification, member of a class or not, the class likelihood factor 121 is compared to a threshold value. If the likelihood is above the threshold value, it is declared a member of the class; otherwise, it is declared a non-member. As is common in the art, the choice of the threshold value involves a trade-off between "Type I errors", declaring a non-member a member, and "Type II errors", declaring a member a non-member. A choice of a high threshold value reduces the potential of declaring a non-member to be a member, but increases the potential of not declaring a member to be a member. This trade-off choice is typically made based on the consequences of an incorrect determination. For example, in the example manufacturing application, if the declaration of membership in the class introduces an extra manufacturing step, such as a reapplication of a prior step, but an erroneous declaration of non-membership results in the continued manufacture of an item that will not be saleable, the threshold will be set fairly low. Conversely, a declaration of membership that forces the item to be discarded may be set higher.

In a multi-class system, the classifier 130 similarly assesses the class likelihood factors 121 to determine which one of a plurality of classes the image is a member. A similar determination of threshold values, typically based on the consequences of errors, is commonly used to effect such a one-of-many classification. A particular image classification may also be based on a plurality of pattern classes. For example, a particular image classification may be defined as a simultaneous high likelihood factor of certain specified pattern classes, coupled with a low likelihood factor of other specified pattern classes. Another particular image classification may contain "don't care" pattern classes, wherein a particular combination of specified pattern likelihoods indicate membership in the image class, independent of the likelihood factors of the "don't care" pattern classes. Note that one of the classes of the multi-class system may be an "unknown" class, for those images that do not exhibit a predominantly high class likelihood 121 in any of the defined classes.

As presented above, it is apparent that the effectiveness of the image classification system 100 is dependent upon a number of parameters. Each of the processing blocks 110, 120, and 130 has parameters that may affect the determination of the class 131 within which the image 101 is a member. The effectiveness of the image characteristics 111 in providing sufficient information for pattern recognition, for example, will be dependent upon the number of partitions for which the image 101 is characterized. The effectiveness may also be dependent upon whether the image is characterized by color, particular edge orientations, and so on. As noted above, in the example of a neural network used for pattern recognition, the effectiveness of the pattern matcher 120 in providing sufficient information for determining the likelihood 121 of each class will be dependent upon the parameters that define the architecture of the neural network, such as the number of hidden layers and nodes per level. Similarly, the effectiveness is also dependent upon the parameters associated with the learning process, such as the magnitude of the modification to the weights, discussed above. In a non-learning implementation of the pattern matcher 120, such as a conventional rule based system, the parameters may include the threshold levels for particular rules, the weight of each rule in a voting system, and the like. In like manner, the effectiveness of the classifier 130 in providing a one-of-many selection will be dependent on the aforementioned decision threshold levels used to determine class membership, or the particular pattern classes specified in the image classification definition. Note that each of the processes 110, 120, and 130 are interrelated. A coarse characterization 111 of an image may require fewer input nodes in the pattern matcher 120, and may not require many hidden layers; a loose set of criteria in the classifier 130 may obviate the need for a detailed characterization 111 of the image; and so on. The causal and interdependent relationships among the parameters used in each of the processes 110, 120, and 130 are difficult, if not impossible, to describe by an algorithm. Thus, determining the correct value for each parameter of each process, and/or the combination of parameter values among the processes to maximize the effectiveness of the classification system 100 is not commonly feasible by algorithmic means.

A class of algorithms, termed evolutionary algorithms, has been found to be particularly useful in the determination of combinations of parameters that produce a maximized task effectiveness, without requiring a specific determination of each parameter's individual or combinatorial effectiveness in performing the task. In accordance with this invention, an evolutionary algorithm is used to direct the generation and evaluation of alternative architectures and parameters used to effect the image classification task.

Evolutionary algorithms operate via an iterative offspring production process. Evolutionary algorithms include genetic algorithms, mutation algorithms, and the like. In a typical evolutionary algorithm, certain attributes, or genes, are assumed to be related to an ability to perform a given task, different combinations of genes resulting in different levels of effectiveness for performing that task. The evolutionary algorithm is particularly effective for problems wherein the relation between the combination of attributes and the effectiveness for performing the task does not have a closed form solution.

The offspring production process is used to determine a particular combination of genes that is most effective for performing a given task, using a directed trial and error search. A combination of genes, or attributes, is termed a chromosome. In the genetic algorithm class of evolutionary algorithms, a reproduction-recombination cycle is used to propagate generations of offspring. Members of a population having different chromosomes mate and generate offspring. These offspring have attributes passed down from the parent members, typically as some random combination of genes from each parent. In a classic genetic algorithm, the individuals that are more effective than others in performing the given task are provided a higher opportunity to mate and generate offspring. That is, the individuals having preferred chromosomes are given a higher opportunity to generate offspring, in the hope that the offspring will inherit whichever genes allowed the parents to perform the given task effectively. The next generation of parents are selected based on a preference for those exhibiting effectiveness for performing the given task. In this manner, the number of offspring having attributes that are effective for performing the given task will tend to increase with each generation. Paradigms of other methods of generating offspring, such as asexual reproduction, mutation, and the like, are also used to produce offspring having an increasing likelihood of improved abilities to perform the given task.

In the context of this invention, the attributes of the parents and offspring represent the selection of parameters 151–153 for one or more of the processes 110, 120, and 130. The evolutionary algorithm generates alternative sets of parameters in a directed trial and error search for a set of parameters that provides for an effective image classification system.

A multitude of evolutionary algorithms are available that may be employed in accordance with this invention. The CHC Adaptive Search Algorithm has been found to be particularly effective for complex combinatorial engineering tasks. U.S. Pat. No. 5,390,283, "Method for Optimizing the Configuration of a Pick and Place Machine", by Larry J.

Eshelman and James D. Schaffer, issued Feb. 14, 1995, presents the use of the CHC algorithm for determining a near-optimal allocation of components in a "pick and place" machine, and is incorporated herein by reference. As compared to other evolutionary algorithms, the CHC algorithm is a genetic algorithm that employs a survival of the fittest selection, wherein only the best performing individuals, whether parent or offspring, are used to generate subsequent offspring. To counteract the adverse genealogical effects that such selective survival can introduce, the CHC algorithm avoids incestuous matings, matings between individuals having very similar attributes. As would be evident to one of ordinary skill in the art, each evolutionary algorithm exhibits pros and cons with respect to the schema used to effect an iterative solution, and the particular choice of evolutionary algorithm for use in this invention is optional.

Figure 2:
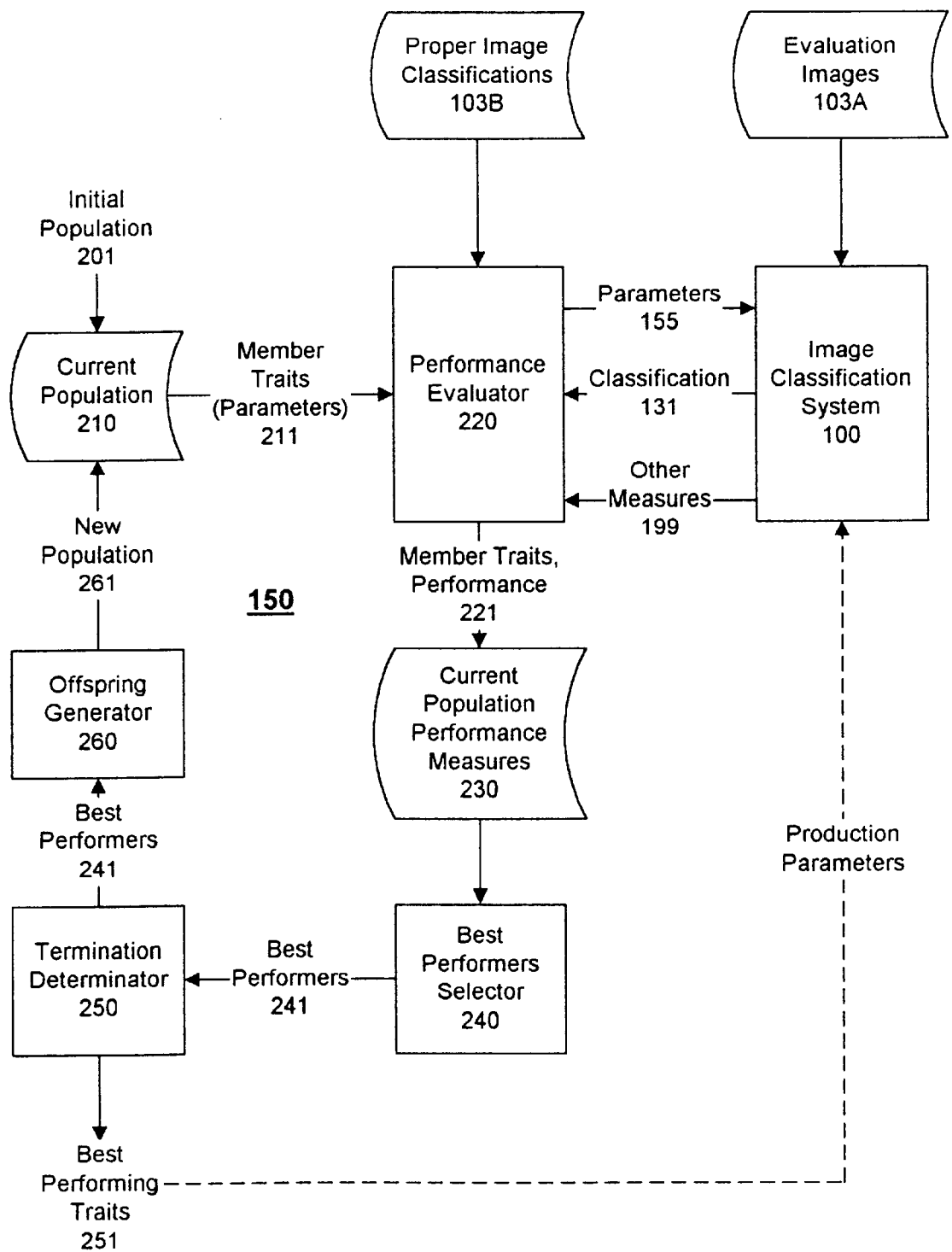
FIG. 2 illustrates an example block diagram of a training system for an image classification system in accordance with this invention.

FIG. 2 illustrates a more detailed block diagram of an example evolutionary algorithm 150 in accordance with this invention. An initial population 201 provides the initial members of a current population 210. Each member of the population 210 is represented as a chromosome that is an encoding of particular parameter values for use in the image classification system 100. In a preferred embodiment, for example, the chromosomes contain a set of genes that define the number of layers to use in a neural network used in the pattern matcher 120; another set of genes represent the number of hidden nodes within each layer; and, another set of genes represent other parameters used for training the neural network, such as the magnitude of the modification of the weights used for each input to the nodes of the neural network. Other parameters, such as the aforementioned threshold values for classification, the number of image partitions, and the like, may be included as gene encodings in each member chromosome of the population 210, as discussed above. Note that not all parameters used by the image processor 110, pattern recognizer 120, and classifier 130 need be assessed or provided by the evolutionary algorithm 150. Select parameters from one or more of the processes 110, 120, 130 are encoded for evolutionary development, typically based on the relative difficulty of determining an appropriate value to use for the parameter. The choice of select parameters will depend on the particular configuration and complexity of the image classification system 100 employed, as well as the time available to perform the parameter determinations. For example, determining the most effective number of hidden layers and nodes in a neural network is typically more difficult than determining an effective threshold value for class membership. The evolutionary algorithm 150 in a preferred embodiment that employs a neural network includes a gene encoding for the number of hidden layers and nodes in the neural network, but leaves the gene encoding of threshold values optional.

In accordance with this invention, the performance evaluator 220 provides the parameters 155 corresponding to the traits 211, or chromosomes, of each member of the population 210 to the image classification system 100. The parameters 155 comprise one or more of the parameters of the parameter sets 151, 152, and 153 in FIG. 1. The image classification system 100 applies each of the parameters 155 to their corresponding blocks 110 120, 130 of FIG. 1. That is, for example, if the parameters 155 include the number of layers in a neural network of the pattern matcher 120, the image classification system 100 configures the pattern matcher 120 to contain the specified number of layers in its neural network. If the image classification system 100 contains a learning system, the training sequence discussed above is applied using the configuration corresponding to the parameters 155 of the particular member 211 of the current population 210. When the image classification system 100 is suitably configured and trained, a set of evaluation images 103A are provided to the image classification system 100 for classification. The resultant classification 131 of each evaluation image 103A is provided to the performance evaluator 220, via a corresponding switch setting of switch S2 in FIG. 1. The performance evaluator 220 compares the resultant classifications 131 of the set of evaluation images 103A to a set of proper image classifications 103B to evaluate the performance of the image classification system 100 when configured with the particular set of parameters 155 of each member 211 of the population 210. The proper image classification 103B for each evaluation image 103A is typically provided by an expert in the particular field of application for the image classification system 100. For example, a quality control engineer may provide the set of proper image classifications 103B for a manufacturing inspection system; a museum curator may provide the set of proper image classifications 103B for an art classification system; or, a common user may provide the set of proper image classifications 103B for an individualized image classification system. The correspondence between the resultant classification 131 and the proper classification 103B provides a measure of the accuracy of the image classification system 100 when configured in accordance with the parameters 155 of each member 211.

The performance evaluator 220 provides a performance indicator 221 corresponding to each member 211 of the population 210. This performance indicator 221 is a measure that can be used to rank the performance of each of the members 211 of the population 210. In accordance with another aspect of this invention, the image classification system 100 provides other measures 199 that are used in this ranking process. The other measures 199 include for example, intermediate values used in the determination of the class likelihood factors 121, or related performance measures, such as the time required for the image classification system 100 to classify each evaluation image 103A. If, for example, a system 100 configured to one member's traits 211 requires a significantly longer time duration to achieve a slightly greater accuracy than a system 100' configured to another member's traits 211', the other member 211' may be given a better performance indicator 221. Multivariate ranking techniques, including weighted averages and the like, are common in the art.

The performance measure 221 for each member 211 of the current population 210 is provided to a best performers selector 240. In the example CHC genetic algorithm, the upper ranking members of the population are selected as the set of best performers 241. These selected upper ranking members generate offspring at the offspring generator 260. The upper ranking members and their offspring form a new population 261 that replaces the current population 210, and the above process is repeated. Thus, with each iteration, the best performers of each iteration are selected to generate offspring that inherit their traits, so as to increase the likelihood of producing better performing offspring traits, or image classification parameters, with each iteration.

The termination determinator 250 determines whether to continue the iterations of offspring generation and reevaluation. In a preferred embodiment, the termination is based on whether the set of best performers 241 converge, or a specified number of iterations have been performed, or an adequate classification performance has been achieved, whichever occurs first. In a preferred embodiment, the termination determinator also optionally restarts the process with a mutated set of best performers after termination, to avoid a possible convergence to a local minimum. When the process is terminated, at 250, the traits 251 of the single best performing member 241 are selected as the preferred parameters for the image classification system 100, when placed in a production mode for classifying new images 101, in FIG. 1.

Figure 3:
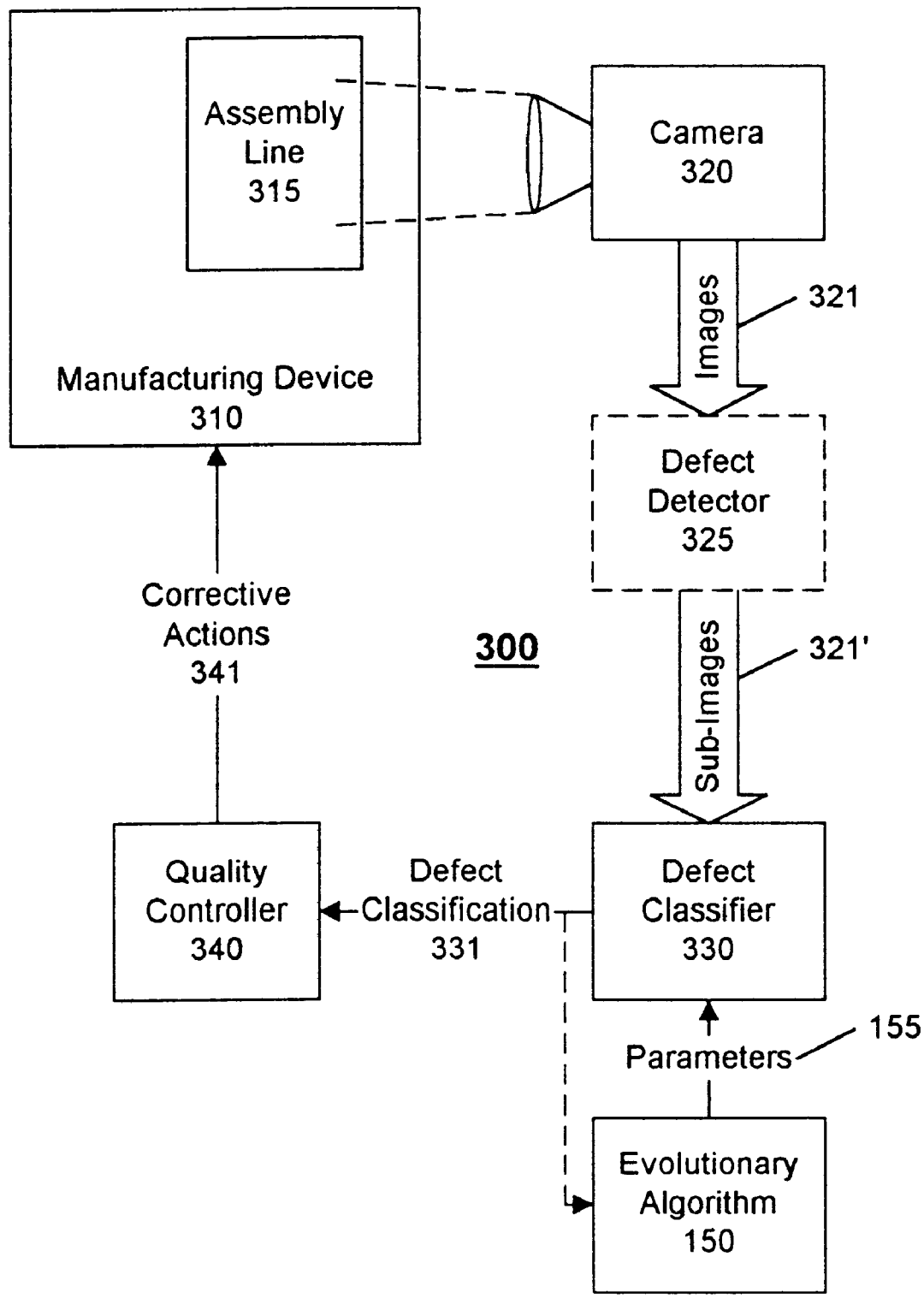
FIG. 3 illustrates an example block diagram of a manufacturing system that includes an image classification system in accordance with this invention.

FIG. 3 illustrates an example block diagram of a manufacturing system 300 in accordance with this invention. A manufacturing device 310 produces items that appear on an assembly line 315. A camera 320 provides an image 321 corresponding to a particular aspect of an item on the assembly line 315. An optional defect detector 325 preprocesses the image 321 to determine whether a defect is present, to avoid the cost of the subsequent defect classification task for defect-free items. The defect detector 325 provides the image, or a portion of the image 321' containing the suspect defect, to the defect classifier 330. In accordance with this invention, the defect classifier 330 includes an image classification system 100 that provides a defect classification output 331 that is based upon at least one parameter value 155 provided by an evolutionary algorithm 150, as discussed above. A quality controller 340 uses the defect classification 331 to determine an appropriate corrective action 341, such as recycling the inspected item, shutting down the system, and so on. This appropriate corrective action 341, if any, is provided to the manufacturing device 310 to effect the required corrective action.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the proper image classification 103B for each evaluation image 103A is typically provided by a human, although a trusted automated characterization system could provide the classification 103B as well. That is, the evolutionary algorithm 150 can provide alternative configurations for comparison to a known classification system, for example, to provide a lower cost or faster replacement system. Note also that the classifications need not be "formal". A user may create an image classification system wherein, for example, images of automobiles, are classified as "like" and "dislike". If there is a correlation between patterns in the automobile images and the user's "like" and "dislike" classifications, then the system 100 may be effectively utilized to identify new automobile images that the user may like. Such a system 100 may be deployed to search and categorize images that are found on the Internet, for example, such that the user is alerted whenever a new automobile image is located that the user may like.

The configurations and functional partitionings are presented in the figures for illustrative purposes. For example, the performance evaluator 220 of FIG. 2 may be included within the image classification system 100, rather than in the evolutionary algorithm 150 as illustrated. The elements of this invention may be implemented in hardware, software, or a combination of both. For example, the pattern matcher 120 may be implemented in a programmable gate array, and the parameters 155 are used to reprogram the gate array to effect each trial configuration. Alternatively, the image processor 110 may be an application specific integrated circuit, while the pattern recognizer is a software program operating on a general purpose processor. These alternative configurations and system optimizations will be evident to one of ordinary skill in the art in view of this invention, and are included within the scope of the following claims.

We claim:

1. An image classification system comprising:
an image processor that processes an image to produce image characteristics;
a pattern matcher, operably coupled to the image processor, that processes the image characteristics to produce at least one class likelihood factor, and
a classifier, operably coupled to the pattern matcher, that processes the at least one class likelihood factor to produce an image classification corresponding to the image,
wherein
the image processor uses image processing parameters, the pattern matcher uses pattern matching parameters, the classifier uses classifying parameters, and
an evolutionary algorithm determines at least one parameter of the image processing parameters, the pattern matching parameters, and the classifying parameters, based on a set of evaluation images and corresponding proper image classifications without a priori definition of a specific learning system architecture.

2. The image classification system of claim 1, further including the evolutionary algorithm.

3. The image classification system of claim 1, wherein:
the pattern matcher includes a neural network, and
the at least one parameter determined by the evolutionary algorithm includes at least one of: a number of layers in the neural network, a number of hidden nodes in at least one layer of the neural network, and a feedback learning parameter.

4. The image classification system of claim 1, wherein:
the image processor partitions the image into a number of image partitions, each image partition having a partition measurement whose value provides a component of the image characteristics, and
the at least one parameter determined by the evolutionary algorithm includes at least one of: the number of image partitions and the partition measurement.

5. The image classification system of claim 1, wherein the at least one parameter determined by the evolutionary algorithm is a threshold value that is used by at least one of: the image processor, the pattern matcher, and the classifier to produce the image characteristics, the at least one class likelihood factor, and the image classification, respectively.

6. A manufacturing system comprising:
a manufacturing device that produces an item of manufacture,
a camera that provides an image of the item of manufacture,
a defect classifier, operably coupled to the camera, that provides defect classification based on the image to facilitate a determination of corrective action to be applied to at least one of: the manufacturing device and the item of manufacture, wherein
the defect classifier provides the defect classification in dependence upon at least one parameter provided by an evolutionary algorithm without a priori definition of a specific learning system architecture.

7. The manufacturing system of claim 6, wherein the defect classifier comprises
an image processor that processes the image to produce image characteristics,
a pattern matcher, operably coupled to the image processor, that processes the image characteristics to produce at least one class likelihood factor, and an image classifier, operably coupled to the pattern matcher, that processes the at least one class likelihood factor to produce the defect classification corresponding to the item of manufacture, wherein the image processor uses image processing parameters, the pattern matcher uses pattern matching parameters, the image classifier uses classifying parameters, and the at least one parameter provided by the evolutionary algorithm includes at least one of: the image processing parameters, the pattern matching parameters, and the classifying parameters.

8. The manufacturing system of claim 7, wherein:

the pattern matcher includes a neural network, and the at least one parameter determined by the evolutionary algorithm includes at least one of: a number of layers in the neural network, a number of hidden nodes in at least one layer of the neural network, and a feedback learning parameter.

9. The manufacturing system of claim 7, wherein:

the image processor partitions the image into a number of image partitions, each image partition having a partition measurement whose value provides a component of the image characteristics, and the at least one parameter determined by the evolutionary algorithm includes at least one of: the number of image partitions and the partition measurement.

10. The manufacturing system of claim 7, wherein the at least one parameter determined by the evolutionary algorithm is a threshold value that is used by at least one of: the image processor, the pattern matcher, and the image classifier to produce the image characteristics, the at least one class likelihood factor, and the defect classification, respectively.

11. The manufacturing system of claim 6, wherein the at least one parameter provided by the evolutionary algorithm is based on a set of evaluation images and corresponding proper image classifications.

12. The manufacturing system of claim 6, further including a defect detector, operably coupled to the camera, that provides the image to the defect classifier in dependence upon a detection of a defect.

13. The manufacturing system of claim 6, further including the evolutionary algorithm.

14. A method for classifying an image, comprising:

processing the image based on image processing parameters to produce image characteristics, processing the image characteristics based on pattern matching parameters to produce at least one class likelihood factor, and processing the at least one class likelihood factor based on classifying parameters to produce an image classification corresponding to the image, wherein at least one parameter of the image processing parameters, the pattern matching parameters, and the classifying parameters are provided by an evolutionary algorithm without a priori definition of a specific learning system architecture.

15. The method of claim 14, further including:

providing the at least one parameter based on a set of evaluation images and corresponding proper image classifications.

16. The method of claim 14, wherein processing the image characteristics includes applying the image characteristics to input nodes of a neural network, exercising the neural network to produce a resultant output of the neural network, and producing the at least one class likelihood factor based on the resultant output of the neural network, and wherein the at least one parameter determined by the evolutionary algorithm includes at least one of: a number of layers in the neural network, a number of hidden nodes in at least one layer of the neural network, and a feedback learning parameter.

17. The method of claim 14, wherein processing the image includes partitioning the image into a number of image partitions, each image partition having a partition measurement whose value provides a component of the image characteristics, and wherein the at least one parameter determined by the evolutionary algorithm includes at least one of: the number of image partitions and the partition measurement.

18. The method of claim 14, wherein the at least one parameter determined by the evolutionary algorithm is a threshold value that is used to produce at least one of: the image characteristics, the at least one class likelihood factor, and the image classification.

* * * * *